(12) United States Patent
Tsuruta

(10) Patent No.: US 10,998,154 B2
(45) Date of Patent: May 4, 2021

(54) POWER RELAY DEVICE WITH READILY ACCESSIBLE CONNECTION TERMINAL

(71) Applicant: Sumitomo Wiring Systems, Ltd., Mie (JP)

(72) Inventor: Takashi Tsuruta, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/548,139

(22) Filed: Aug. 22, 2019

(65) Prior Publication Data

US 2020/0075278 A1    Mar. 5, 2020

(30) Foreign Application Priority Data

Aug. 28, 2018   (JP) ............................. JP2018-159077

(51) Int. Cl.
| | |
|---|---|
| *B60R 16/02* | (2006.01) |
| *H01H 45/04* | (2006.01) |
| *B60R 16/033* | (2006.01) |
| *B60R 16/023* | (2006.01) |
| *H01R 9/22* | (2006.01) |
| *H02G 3/08* | (2006.01) |
| *F02N 11/08* | (2006.01) |
| *H01H 85/20* | (2006.01) |

(52) U.S. Cl.
CPC ......... *H01H 45/04* (2013.01); *B60R 16/0215* (2013.01); *B60R 16/0238* (2013.01); *B60R 16/033* (2013.01); *F02N 11/0862* (2013.01); *H01R 9/226* (2013.01); *H02G 3/086* (2013.01); *H01H 2085/208* (2013.01); *H01M 2220/20* (2013.01); *H01R 2201/26* (2013.01)

(58) Field of Classification Search
CPC .... B60R 16/0238; B60R 16/02; H01H 45/04; H01H 2085/208; H01H 9/2425; H01H 9/226; H01H 9/24; H01H 2201/26; H01H 50/04; H01H 50/048; H01H 2050/049; H01R 13/113; H01R 2201/26; H01R 9/24; H01R 9/26; H01R 9/33; H02G 3/16
See application file for complete search history.

(56) References Cited

U.S. PATENT DOCUMENTS

| | | | |
|---|---|---|---|
| 5,562,502 A * | 10/1996 | Kourimsky | ............ H01H 85/20 439/620.27 |
| 6,022,247 A * | 2/2000 | Akiyama | ............ B60R 16/0238 439/701 |
| 7,212,089 B2 * | 5/2007 | Nakamura | ............... H01H 9/10 307/10.1 |

FOREIGN PATENT DOCUMENTS

JP        2017-169407 A     9/2017

\* cited by examiner

*Primary Examiner* — Vanessa Girardi
(74) *Attorney, Agent, or Firm* — Abelman, Frayne & Schwab

(57) ABSTRACT

A connection terminal 9 of a cable 8 is fastened to a right area of a terminal block of a relay box 1, using a bolt 26. At this time, a connection terminal 6 of a power supply cable 5 is not connected to a power supply-side terminal 11 or a relay terminal 15, and power is not supplied from a battery to power seats. Then, a tab 30 provided on the connection terminal 6 of the power supply cable 5 is inserted into the relay terminal 15 from an inlet 19, and the connection terminal 6 and the relay terminal 15 are electrically connected to each other temporarily. Thus, operations of the power seats are checked.

2 Claims, 6 Drawing Sheets

POWER RELAY DEVICE WITH READILY ACCESSIBLE CONNECTION TERMINAL

CROSS-REFERENCE TO RELATED APPLICATIONS

This application is based on and claims priority from Japanese Patent Application No. 2018-159077, filed on Aug. 28, 2018, with the Japan Patent Office, the disclosure of which is incorporated herein in their entireties by reference.

TECHNICAL FIELD

The present invention relates to a power relay device.

BACKGROUND

Conventionally, in a vehicle assembly plant, operations of electrical components are checked using battery power, through electrical component checks that are performed in the course of assembly. In recent years, a battery may be installed in a location from which a battery cannot be easily taken out, such as in a console, because a vehicle is a hybrid vehicle or has an enlarged engine and the battery cannot be installed in an engine room (see, for example, Japanese Patent Laid-open Publication No. 2017-169407).

SUMMARY

If a battery is installed in a console or the like, it is difficult to detach the battery terminal, and if the battery terminal is always kept in a connected state until the shipment of the vehicle so that electrical component checks can be performed, the capacity of the battery decreases.

The present invention has been made in view of such a problem, and aims to provide a power relay device that can suppress a decrease in the capacity of a power supply.

A power relay device that solves the above-described problem is a power relay device that relays power from a power supply to an electrical component, the power relay device including: a device body that is provided with at least one of a power supply-side terminal that is to be electrically connected to the power supply and a load-side terminal that is to be electrically connected to the electrical component, and a relay terminal that is configured to be electrically connected to the at least one terminal; and a cable of which one end side is provided with a connection terminal that is configured to be electrically connected to the relay terminal, and the other end side is to be electrically connected to the power supply or the electrical component to which the at least one of the power supply-side terminal and the load-side terminal is to be connected.

With this configuration, it is possible to temporarily supply power from a power supply to an electrical component by electrically connecting the relay terminal that is provided in the device body and the connection terminal that is provided on the cable, when necessary. As a result, a state in which power is constantly supplied from the power supply to the electrical component does not continue, and therefore it is possible to suppress a decrease in the capacity of the power supply.

In the above-described power relay device, the connection terminal provided on the cable may be provided with a tab that is configured to be inserted into, and electrically connected to, the relay terminal.

With this configuration, it is possible to supply power from the power supply to the electrical component by inserting the tab of the connection terminal into the relay terminal. As a result, it is possible to easily check operations of the electrical component.

In the above-described power relay device, the tab provided on the connection terminal may be defined as a first tab, and the at least one of the power supply-side terminal and the load-side terminal may be a portion of a thin plate that is attached to the device body, and the thin plate may be provided with a second tab that is configured to be inserted into, and electrically connected to, the relay terminal.

With this configuration, it is possible to supply power from the power supply to the electrical component by inserting the second tab provided on the plate into the relay terminal to attach the plate and the relay terminal to each other, attaching them to the device body, and inserting the first tab provided on the connection terminal of the cable into the relay terminal. In this way, by establishing tab connection at two points on a single relay terminal, it is possible to obtain a simple and reliable terminal contact structure.

According to the present invention, it is possible to suppress a decrease in the capacity of a power supply.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

The following describes an embodiment of a power relay device.

Figure 1:
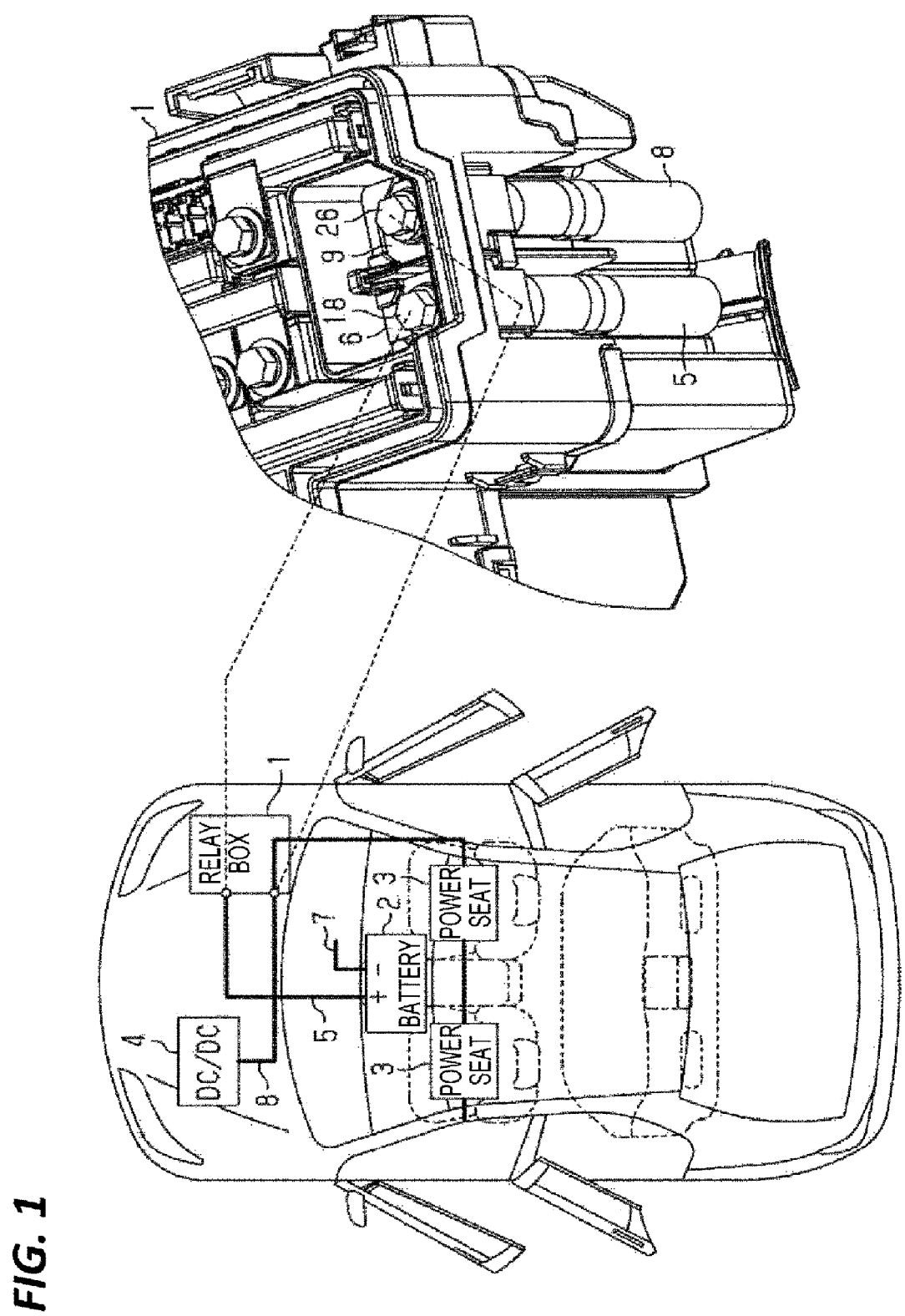
FIG. 1 shows an arrangement of components illustrating an example in which power of a battery installed in a console inside a vehicle is relayed by a power relay device that includes a relay box and is installed in an engine room, and is supplied to power seats, and a perspective view of a main part of the power relay device.

As shown in FIG. 1, a relay box 1 that is included in an example of a power relay device is installed in an engine room, and relays power of a battery 2 that is installed in a console or the like inside a vehicle, to power seats 3 which are examples of electrical components. Also, a DC/DC converter 4 is installed in the engine room, and the relay box 1 relays power from the DC/DC converter 4 to the power seats 3. When the vehicle travels, the power seats 3 operates using power output from the DC/DC converter 4, and in a vehicle assembly plant, operations of the power seats 3 are checked using power of the battery 2, through electrical component checks that are performed in the course of assembly. The battery 2 is an example of the power supply.

One end of a power supply cable 5 is electrically connected to the anode of the battery 2, and a connection terminal 6 that is provided at the other end of the power supply cable 5 is fastened to one area (a left area for the purpose of illustration) of a terminal block of the relay box 1, using a bolt. One end of a ground cable 7 is electrically connected to the cathode of the battery 2, and the other end of the ground cable 7 is electrically connected to the vehicle body and is grounded. The power supply cable 5 is an example of the cable, and the connection terminal 6 is an example of the connection terminal.

A connection terminal 9 that is provided at one end of a cable 8, which is different from the power supply cable 5, is fastened, using a bolt, to the other area (a right area for the purpose of illustration) the terminal block of the relay box 1, which is adjacent to the aforementioned one area, and the other end of the cable 8 is electrically connected to the output terminal of the DC/DC converter 4.

Figure 2:
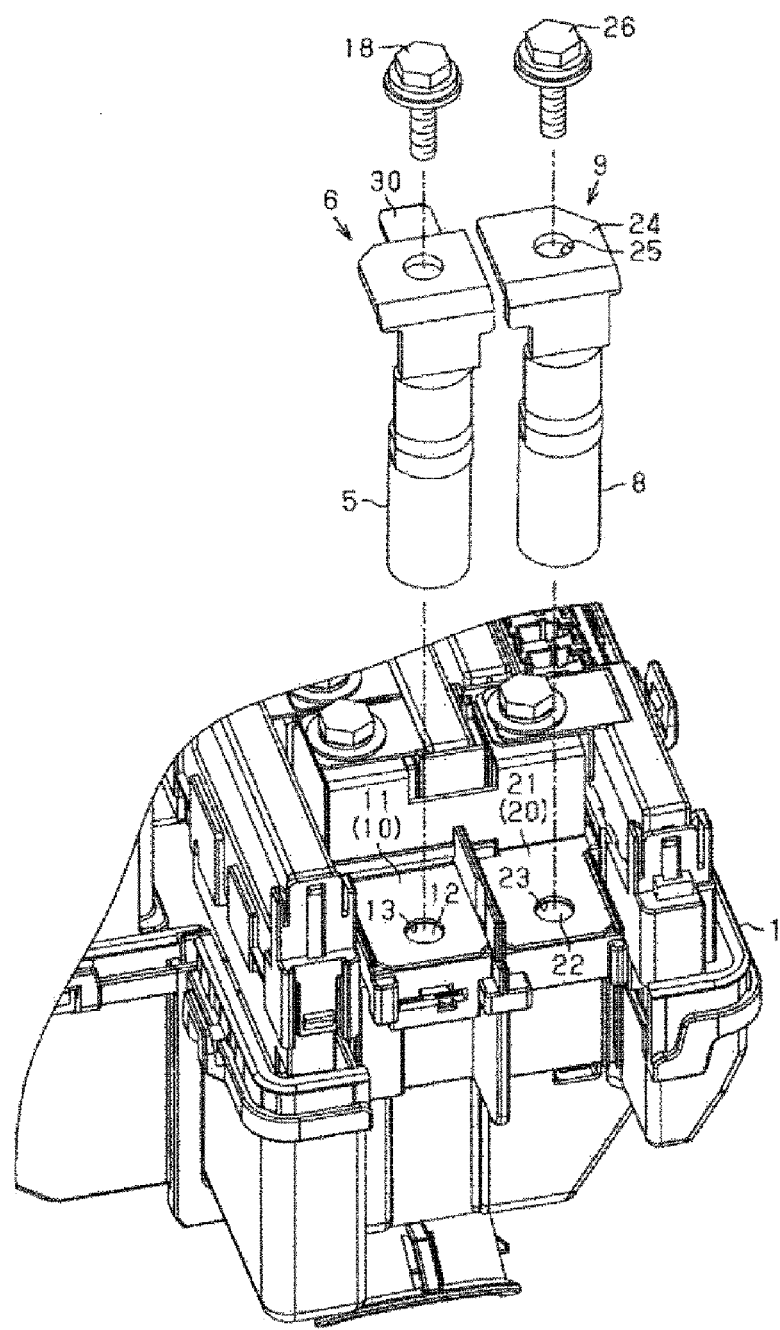
FIG. 2 is an exploded perspective view of the main part of the power relay device.
Figure 3:
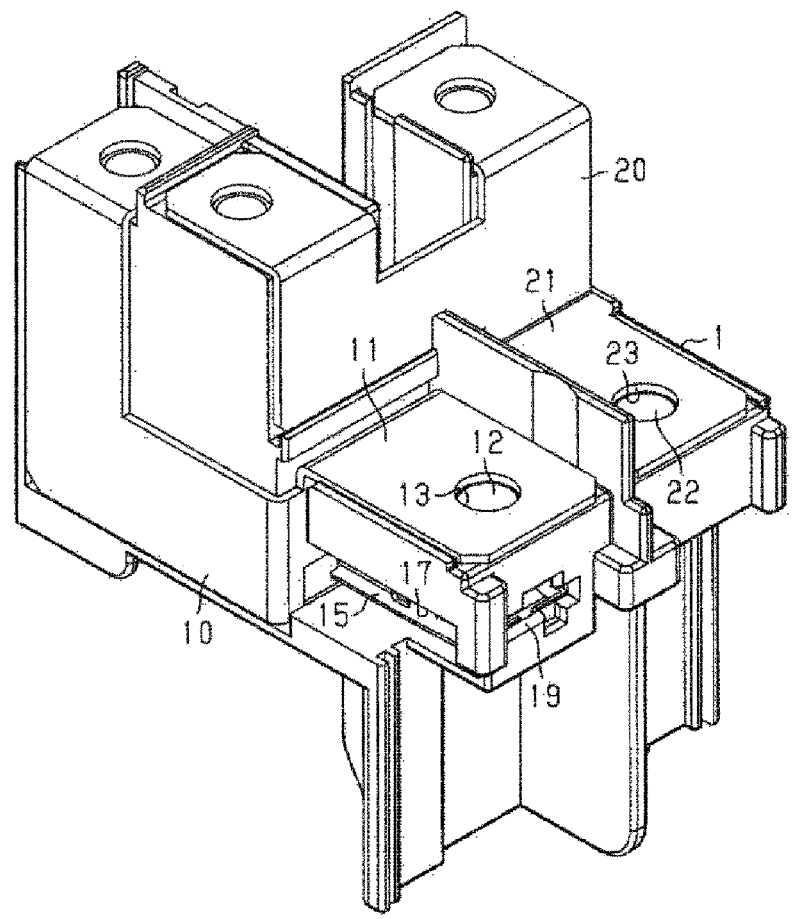
FIG. 3 is a perspective view showing a main part of the relay box.
Figure 4:
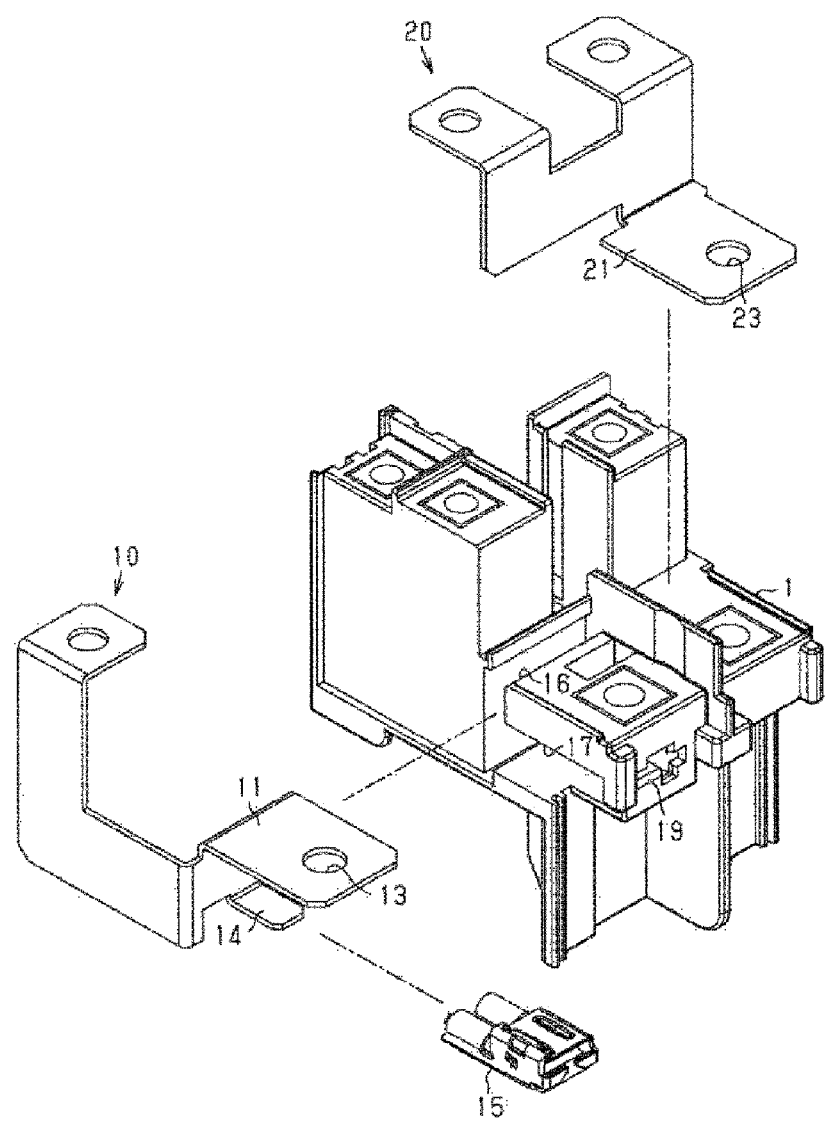
FIG. 4 is an exploded perspective view showing the main part of the relay box.

As shown in FIGS. 2 to 4, the aforementioned one area of the terminal block of the relay box 1 is provided with a power supply-side terminal 11 to which the connection terminal 6 is to be electrically connected, and the aforementioned other area is provided with a load-side terminal 21 to which the connection terminal 9 is to be electrically connected.

The power supply-side terminal 11 is a portion of a thin plate-shaped first plate 10 attached to the relay box 1, and the load-side terminal 21 is a thin plate-shaped second plate 20 that is attached to the relay box 1. These plates 10 and 20 are separately formed of parts that are independent of each other, and are each manufactured so as to have a predetermined shape through stamping or the like. The first plate 10 is an example of the plate.

The power supply-side terminal 11 has the shape of a plate with a terminal face that extends in a horizontal direction, and a through hole 13 is formed therein, which corresponds to a bolt attachment hole 12 provided in the terminal block. Similarly, the load-side terminal 21 has the shape of a plate with a terminal face that extends in a horizontal direction, and a through hole 23 is formed therein, which corresponds to a bolt attachment hole 22 provided in the terminal block.

The connection terminal 9 has a terminal body part 24 that is to be in surface contact with the upper face of the load-side terminal 21, and a through hole 25, which corresponds to the through hole 23 of the load-side terminal 21, is formed in the terminal body 24. A bolt 26 is inserted through the through hole 25 and the through hole 23 from above the terminal body 24, the bolt 26 is fastened to the bolt attachment hole 22, and thus the connection terminal 9 is held on the aforementioned other area of the terminal block of the relay box 1 (see FIG. 1).

The first plate 10 is provided with, in addition to the power supply-side terminal 11, a tab 14 that is located below the power supply-side terminal 11, and has a tab face that is substantially parallel with the terminal face of the power supply-side terminal 11 and is narrower and shorter than the power supply-side terminal 11. A relay terminal 15 that has a fitting portion that has a shape and a size that match those of the tab 14 is attached to the tab 14. That is, the tab 14 is inserted into the relay terminal 15, and the first plate 10 and the relay terminal 15 are electrically connected to each other.

Thus, the first plate 10 and the relay terminal 15 are attached to each other, and are thereafter attached to the relay box 1. The aforementioned one area of the terminal block of the relay box 1 is provided with a slit 16 that has a shape corresponding to the thickness of the first plate 10 and allows the terminal assembly (the first plate 10 and the relay terminal 15) to be attached to the relay box 1 from the left side. The aforementioned one area is also provided with a terminal housing 17 in which the relay terminal 15 is to be positioned. A bolt 18 is inserted into the through hole 13 from above the power supply-side terminal 11, the bolt 18 is fastened to the bolt attachment hole 12, and thus the first plate 10 is fixed to the relay box 1 together with the connection terminal 6 (see FIG. 2).

Also, the aforementioned one area of the terminal block of the relay box 1 is provided with an inlet 19 that allows for temporal tab connection of the connection terminal 6 from the front side, in communication with the terminal housing 17. A tab 30 that extends in a horizontal direction is formed at the leading end of the connection terminal 6. The tab 30 is inserted from the inlet 19 into the relay terminal 15 in the terminal housing 17, and thus the connection terminal 6 and the relay terminal 15 are electrically connected to each other.

Figure 5:
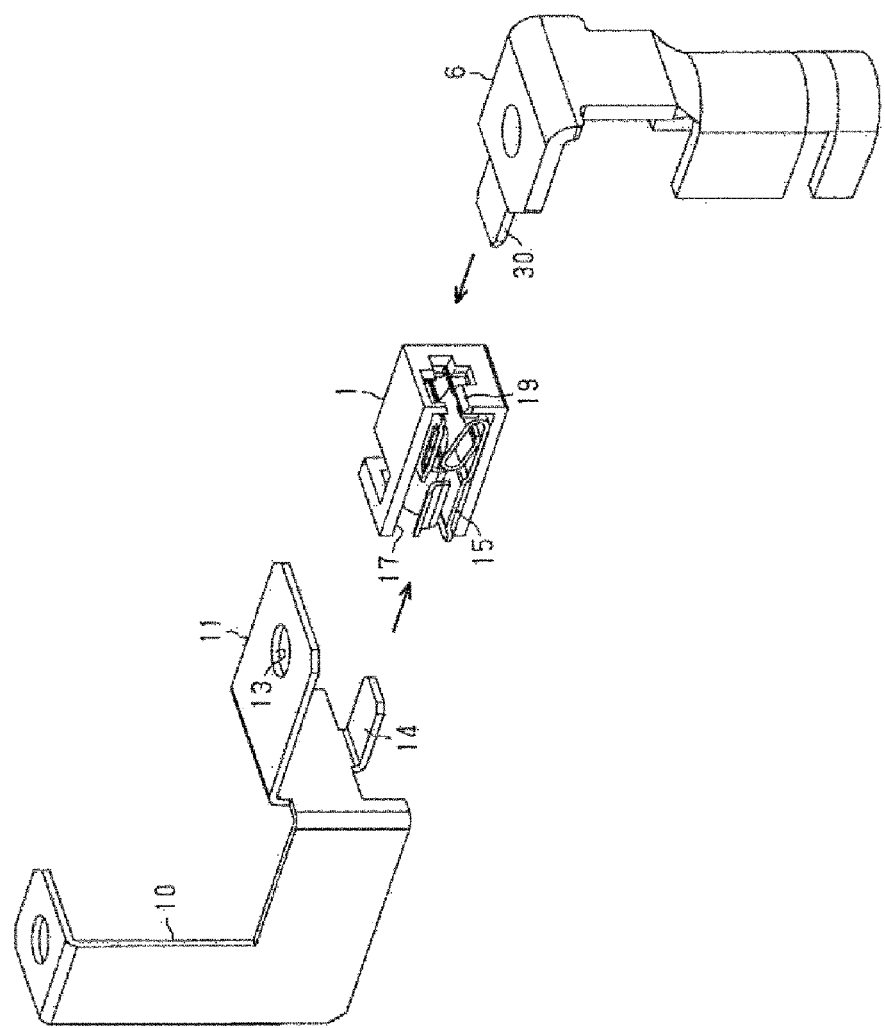
FIG. 5 is an exploded perspective view showing a terminal contact structure.

As shown in FIG. 5, the relay terminal 15 is provided with, in addition to the fitting portion that matches the tab 14, a fitting portion that matches the tab 30, and tab connection to the single relay terminal 15 is established at two positions. Thus, power is supplied from the battery 2 to the power seats 3, and operations of the power seats 3 are checked. The tab 30 is an example of the first tab and the tab 14 is an example of the second tab. Note that FIG. 5 shows a portion of the relay box 1 and a portion of the relay terminal 15 as a cross-sectional view, thereby illustrating the internal structure of the terminal housing 17.

In the present embodiment, an example of the power relay device is constituted by the relay box 1 and the power supply cable 5. The relay box 1 is an example of the device body.

The following describes effects of the power relay device.

Figure 6:
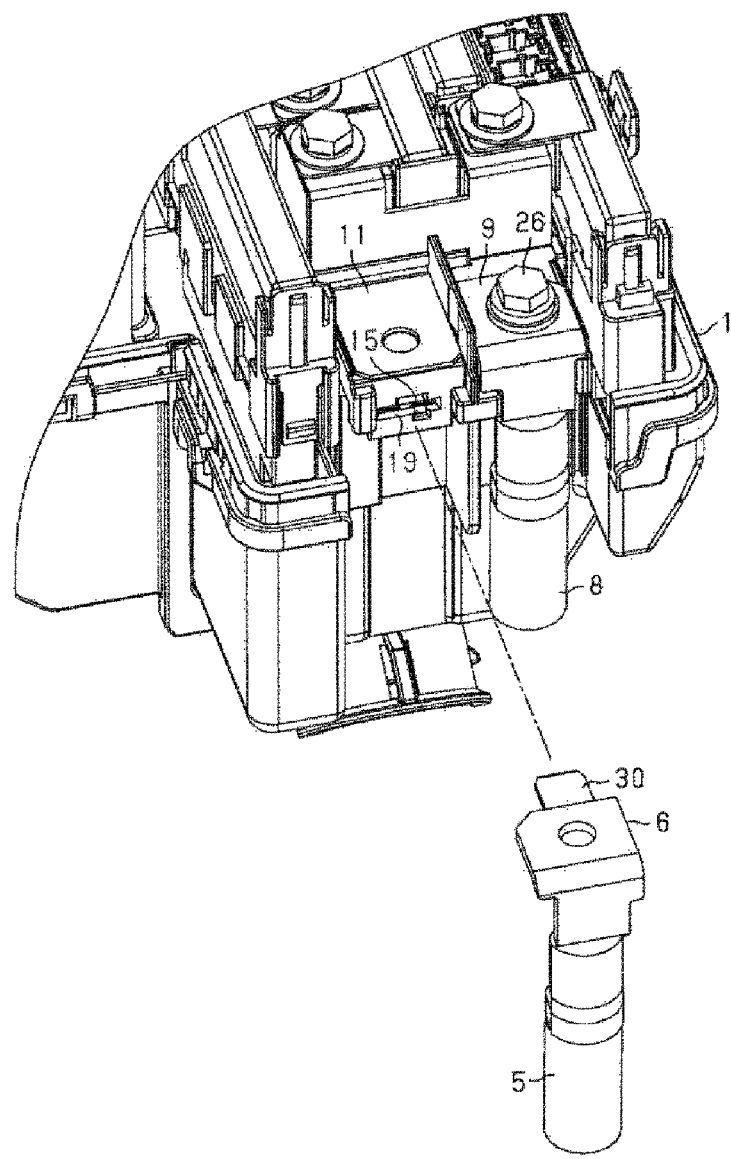
FIG. 6 is a perspective view of the main part of the power relay device when the power relay device need not be supplied with power.

As shown in FIG. 6, the connection terminal 9 of the cable 8 is fastened to the right area of the terminal block of the relay box 1, using the bolt 26. At this time, the connection terminal 6 of the power supply cable 5 is not connected to the power supply-side terminal 11 or the relay terminal 15, and power is not supplied from the battery 2 to the power seats 3.

Then, the tab 30 provided on the connection terminal 6 of the power supply cable 5 is inserted into the relay terminal 15 from the inlet 19, and the connection terminal 6 and the relay terminal 15 are electrically connected to each other temporarily. Thus, operations of the power seats 3 are checked. Note that the tab connection of the connection terminal 6 to the relay terminal 15 is established only when power needs to be supplied, such as when operations of the power seats 3 are to be checked, and otherwise the tab 30 of the connection terminal 6 is removed from the relay terminal 15. Thus, a decrease in the capacity of the battery is suppressed. Of course, when tab connection is established, electrical connection is ensured as a result of the tab 30 being elastically brought into contact due to the elasticity of the fitting portion of the relay terminal 15.

As described above, the present embodiment can achieve the following effects.

(1) It is possible to temporarily supply power from the battery 2 to the power seats 3 by electrically connecting the relay terminal 15 provided in the relay box 1 with the connection terminal 6 provided on the power supply cable 5, when necessary. As a result, a state in which power is constantly supplied from the battery 2 to the power seats 3 does not continue, and therefore it is possible to suppress a decrease in the capacity of the battery.

(2) It is possible to supply power from the battery 2 to the power seats 3 by inserting the tab 30 of the connection terminal 6 into the relay terminal 15. As a result, it is possible to easily check operations of the power seats 3.

(3) It is possible to supply power from the battery 2 to the power seats 3 by inserting the tab 14 provided on the first plate 10 into the relay terminal 15 to attach the first plate 10 and the relay terminal 15 to each other, attaching them to the relay box 1, and inserting the tab 30 provided on the connection terminal 6 of the power supply cable 5 into the relay terminal 15. In this way, by establishing tab connection at two points on a single relay terminal 15, it is possible to obtain a simple and reliable terminal contact structure.

Note that the above-described embodiment may be modified and carried out as described below. The embodiment above and the modifications below may be combined with each other and carried out as long as technical inconsistencies do not arise.

A tab (corresponding to the second tab) that is similar to the tab 14 is provided on the second plate 20 (corresponding to the plate) that includes the load-side terminal 21, instead of, or in addition to, a configuration in which the relay terminal 15 is attached to the tab 14 of the first plate 10 that includes the power supply-side terminal 11, of the power supply-side terminal 11 and the load-side terminal 21. A relay terminal that is similar to the relay terminal 15 may be attached to the tab.

If this is the case, the connection terminal 9 (corresponding the connection terminal) of the cable 8 (corresponding to the cable) is provided with a tab (corresponding to the first tab) that is to be inserted into, and electrically connected with, the above-described relay terminal. Also, the relay box 1 (corresponding to the device body) is provided with, in addition to the a terminal housing that is similar to the terminal housing 17, an inlet that is similar to the inlet 19, such that the inlet is in communication with the terminal housing. With this configuration, it is possible to achieve effects that are similar to those of the above-described embodiment.

The relay terminal 15 and the above-described relay terminal that is similar to the relay terminal 15 are not limited to a configuration in which tab connection is established at two points. For example, in order to obtain a simple and reliable terminal contact structure using tab connection, it suffices if one fitting portion is provided, to which the connection terminal 6 or the connection terminal 9 is connected at one position via a tab.

Electrical components that are to be subjected to operation checks are not limited to the power seats 3.

The power relay device is not limited to being mounted on a vehicle.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A power relay device comprising:
a device body that is provided with a power supply-side terminal of a power supply and a load-side terminal that is to be electrically connected to an electrical component, and a relay terminal that is configured to be electrically connected to the power supply-side terminal relaying power from the power supply to the electrical component; and
a cable of which one end side is provided with a connection terminal that is configured to be electrically connected to the relay terminal, and the other end side is to be electrically connected directly to the power supply to which the power supply-side terminal is to be electrically connected via the relay terminal,
wherein the connection terminal provided on the cable is provided with a tab that is configured to be inserted into, and electrically connected to, the relay terminal,
the tab provided on the connection terminal is defined as a first tab, and
the at least one of the power supply-side terminal and the load-side terminal is a portion of a thin plate that is attached to the device body, and the thin plate is provided with a second tab that is configured to be inserted into, and electrically connected to, the relay terminal.

2. The power relay device according to claim 1, wherein the device body includes a slit that is provided to correspond to a thickness of the thin plate and allows a terminal assembly including the thin plate and the relay terminal to be attached to the device body from a side of the device body.

* * * * *